(No Model.)
P. H. JACOBUS.
CAR MOVER.
No. 504,529. Patented Sept. 5, 1893.
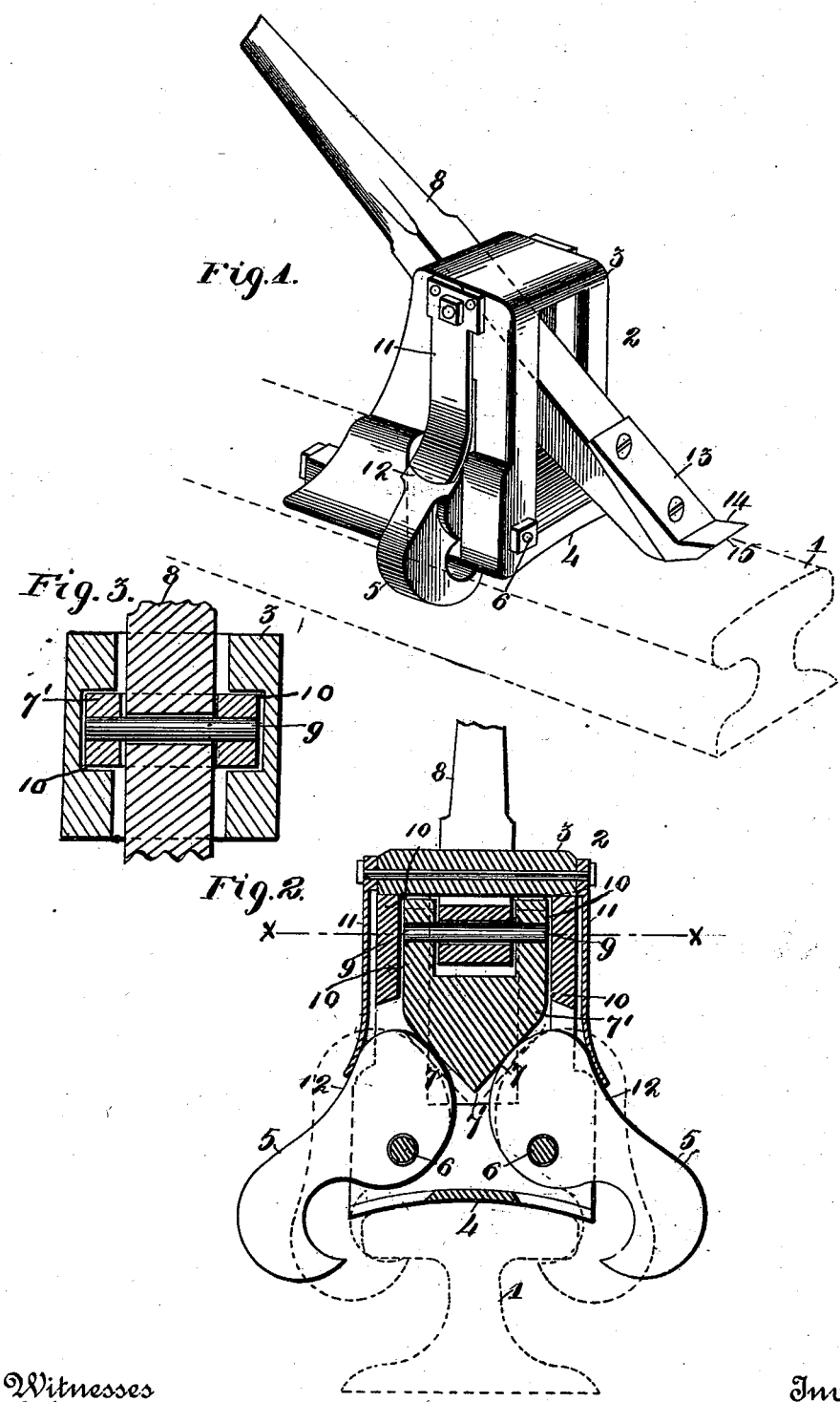
Witnesses
Charles Jacobus
Andrew Bochno
Inventor
Peter H. Jacobus
By his Attorneys
Keller Stark

UNITED STATES PATENT OFFICE.

PETER H. JACOBUS, OF MILLSTADT, ILLINOIS.

CAR-MOVER.

SPECIFICATION forming part of Letters Patent No. 504,529, dated September 5, 1893.

Application filed March 23, 1893. Serial No. 467,243. (No model.)

*To all whom it may concern:*

Be it known that I, PETER H. JACOBUS, of Millstadt, county of St. Clair, State of Illinois, have invented certain new and useful Improvements in Car-Movers, of which the following is a full, clear, and exact description, reference being had to the accompanying drawings, forming a part hereof.

My invention has relation to improvements in car movers and consists in the novel arrangement and combination of parts more fully set forth in the specification and pointed out in the claims.

In the drawings Figure 1 is a perspective view of my complete invention as applied to a rail. Fig. 2 is a transverse section of the same taken through the middle of the fulcrum, and Fig. 3 is a cross section taken on the line $x$—$x$ of Fig. 2.

The car mover or starter to be described is provided with grappling hooks pivoted within a suitable saddle in such a manner that the same are brought in contact with the rail when power is applied to the lever for starting the car. This is accomplished by providing the grappling hooks with cam surfaces above their pivotal connections with which co-operates a wedge-shaped block or fulcrum of a suitable lever.

Referring to the drawings, 1 represents the ordinary rail (shown in dotted lines) and 2 the car mover or starter.

3 represents a saddle or frame the contour of which is best shown in Fig. 1 which shape is best adapted for the purpose, said saddle being provided with a curved bottom 4 which conforms with the upper surface of the rail whereby the same may be easily moved or slid upon the rail in working the device.

The saddle is suitably hollowed out to receive the various parts and movably secured within the same are two grappling hooks 5, 5, by bolts 6, 6, passing through the said hooks and saddle. The grappling hooks are provided with cam surfaces 7, 7, above their pivotal connections against which surfaces a movable wedge shaped block 7' is simultaneously brought in contact; and when power is applied in the manner hereinafter described the said block operates as a fulcrum and is forced between the cam surfaces causing the hooks 5, 5, to assume the position as shown in dotted lines in Fig. 2, thus locking the saddle firmly to the rail. The wedge-shaped block 7' is bifurcated to receive a lever 8 the two being united by a pin 9, the bifurcations allowing sufficient room for the manipulation of the lever as best shown in Fig. 2. The opposite sides of the block 7' are located within suitable guides 10 formed in the opposite inner sides of the hollow of the saddle thus holding the same in their proper positions with relation to the cam surfaces of the grappling hooks. (See Fig. 2.)

11, 11, represent two flat springs which are secured to the opposite outer sides of the saddle the free ends of which normally bear or press upon the outer curved surfaces 12, 12, of the grappling hooks which causes the same to assume the position shown in the solid lines of Fig. 2 or out of contact with the rail, thus allowing the saddle to be moved in any direction upon the rail.

Secured to the upper surface of the short arm of the lever 8 is a plate 13 having an upwardly turned end 14 having an edge 15 which edge is adapted to be brought in contact with the tread of the wheel of the car to be moved when power is applied at the end of the long arm of the lever.

In carrying out my invention the saddle is adjusted upon the rail at a proper distance from the wheel of the car in order that the edge 15 of the plate 13 will be brought in contact with the tread of the wheel when the long arm of the lever is depressed, in which action the wedge-shaped block or fulcrum 7' will be forced downward between the cam surfaces of the grappling hooks 5 causing the same to grip the rail simultaneously the instant the power is applied; and thus the saddle is held to its position as the car is moved. On releasing the lever the springs 11 spread the grappling hooks sufficiently to allow the saddle to be moved to its new position and thus the same series of actions can be repeated indefinitely.

Having described my invention, what I claim is—

1. A car mover consisting of a saddle, grappling hooks provided with cam surfaces and movably secured within the saddle, suitable guides formed in the opposite inner sides of the saddle, a movable bifurcated wedge-shaped block resting upon said cam surfaces, the sides of said block located in said guides, a lever movably secured between said bifurcations, and springs attached to the outside of said saddle the free ends of which bear against the curved outer surfaces of said hooks, substantially as set forth.

2. A car mover consisting of a saddle, grappling hooks movably secured within the same, cam surfaces formed on said hooks, a bifurcated wedge-shaped block movable within the saddle and resting upon said cam surfaces, a lever movably secured between said bifurcations, and springs attached to the outside of said saddle, the free ends of which bear against the curved outer surfaces of said hooks, substantially as set forth.

In testimony whereof I affix my signature in the presence of two witnesses.

PETER H. JACOBUS.

Witnesses:
CHARLES JACOBUS, Jr.,
ANDREW BOEHM.